United States Patent [19]

Birnbaum

[11] Patent Number: 4,511,182
[45] Date of Patent: Apr. 16, 1985

[54] SKATE WHEEL COVER

[76] Inventor: David H. Birnbaum, 49 Vienna, San Francisco, Calif. 94112

[21] Appl. No.: 400,475

[22] Filed: Jul. 21, 1982

[51] Int. Cl.³ .......................... B60B 7/02; B60B 7/06; A63C 7/26
[52] U.S. Cl. ................................ 301/37 P; 301/5.7; 301/108 A
[58] Field of Search .................... 301/5.3, 5.7, 37 R, 301/37 P, 37 CM, 37 L, 108 R, 108 A, 108 SC; 411/373, 377

[56] References Cited

U.S. PATENT DOCUMENTS

| | | |
|---|---|---|
| 326,224 | 9/1985 | Kefuss . |
| 564,323 | 7/1896 | Wynkoop ........................ 301/108 A |
| 1,963,592 | 6/1934 | Pribil .................................... 301/5.7 |
| 2,241,686 | 5/1941 | Ware .................................... 301/108 |
| 2,392,634 | 1/1946 | Bierman ............................. 301/5.3 |
| 2,606,791 | 8/1952 | Specht ................................ 301/5.7 |
| 3,005,906 | 8/1959 | Butler . |
| 3,079,202 | 2/1963 | Evans ............................ 301/108 SC |
| 3,485,134 | 12/1969 | Ott ....................................... 411/372 |
| 4,054,335 | 10/1977 | Timmer ................................. 301/5.3 |
| 4,114,952 | 9/1978 | Kimmell ............................... 301/5.7 |
| 4,235,476 | 11/1980 | Arvidsson ......................... 301/108 R |
| 4,408,803 | 10/1983 | Green et al. ......................... 301/5.7 |

FOREIGN PATENT DOCUMENTS

| | | |
|---|---|---|
| 520958 | 1/1956 | Canada . |
| 165299 | 11/1905 | Fed. Rep. of Germany ... 301/108 A |
| 942325 | 11/1963 | United Kingdom .................. 411/90 |

Primary Examiner—David A. Scherbel
Attorney, Agent, or Firm—Edmund J. Wasp

[57] ABSTRACT

A skate wheel cover has a cover member and a tubular sleeve depending from the back of the cover member. A roller skate wheel is rotatably mounted on an axle by a bearing assembly. The wheel is secured to the axle by a nut threadably received on the end of the axle. The nut and threaded end of the axle extend into the exposed wheel well of the skate wheel. The tubular sleeve of the skate wheel cover is inserted onto the nut in an interference fit relationship to frictionally secure the skate wheel cover to the axle, with the cover member being installed over the wheel well area to improve the appearance of the skate, and to partially seal the bearing assembly from dirt and debris.

3 Claims, 5 Drawing Figures

4,511,182

SKATE WHEEL COVER

BACKGROUND

Roller skates have been in common use in this country and elsewhere for many, many years. Throughout substantially their entire history, however, they have remained virtually unchanged in appearance. This is particularily true of the wheels of roller skates. Typically, the wheels are rotatably mounted on an axle by means of a ball bearing assembly. The axle generally has a threaded end which projects into the external wheel well of the skate wheel, and a nut is threadably engaged on this end to secure the wheel to the axle. The nut and threaded nut of the axle are in plain view in the external wheel well. This exposed wheel well area is somewhat unsightly and has detracted from the appearance of roller skates over these many years that they have been in wide use.

SUMMARY

The present invention, therefore, is to improve the appearance of skate wheels by installing a decorative cover over the external wheel well area. According to the presently preferred embodiment, a tubular member projects from the back of the cover member and is slid onto the wheel mounting nut in an interferance fit relationship to frictionally secure the cover member over the wheel well of the skate wheel. In addition to improving the appearance of the skate, the skate wheel cover to some extent seals the wheel well area from dirt and debris, increasing the longevity and improving the performance of the bearing assembly.

It is therefore an object of the present invention to provide an improved skate wheel assembly.

It is a further object to improve the appearance of skate wheels for roller skates and skate boards.

Another object is to provide a decorative skate wheel cover for skate wheels.

Yet another object is to provide a decorative skate wheel cover which is frictionally and removeably secureable to the mounting nut of a skate wheel.

Still another object is to provide a decorative skate wheel cover which partially seals the wheel well of a skate wheel against dirt and debris.

These and other objects, advantages and novel features of the present invention will become apparent from the following detailed description of the invention taken in conjunction with the accompanying drawings.

DESCRIPTION OF THE PREFERRED EMBODIMENTS

Figure 1:
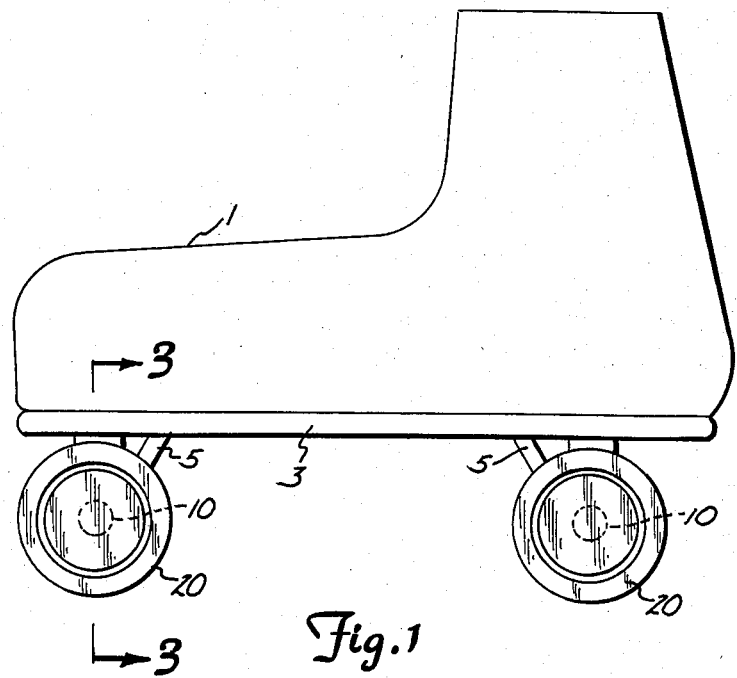
FIG. 1 is an elevational view of the skate wheel cover of the present invention installed on a roller skate.

The skate wheel cover 30 of the present invention is shown installed on a roller skate 1 in FIG. 1. Skate 1 has a rigid sole 3 and axle supports 5 secured to the sole 3 as shown. Axles 10 are supported in any suitable manner by the supports 5. Axles 10 rotatably support wheels 20 through any suitable bearing assembly 15. A ball bearing assembly is suggested in FIG. 3 in that ball bearing assemblies are typically used for skate wheels. The particular design of bearing assembly 15 is not shown in its various particulars in that it is not a part of the invention. Axle 10 has a threaded end 12. Wheel 20 is secured to axle 10 by a wheel mounting nut 25 which is threadably engaged with axle end 12 in the conventional manner. Nut 25 is almost universally a ½ inch hexagonal nut. The nut 25, accordingly, has a hexagonal exterior surface 26. A washer member 27 is provided between the nut 25 and the bearing assembly 15.

Figure 2:
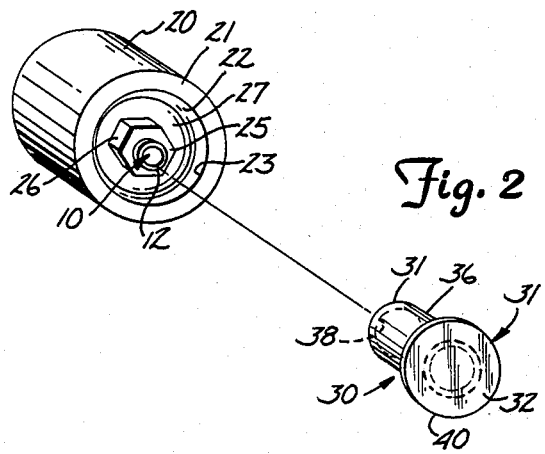
FIG. 2 is a perspective view of a roller skate wheel with the skate wheel cover in an exploded position.

FIG. 2 shows one of the wheels 20 with the skate wheel cover 30 of the present invention in an exploded perspective view. In FIG. 2, axle shaft end 12 and nut 25 project into the wheel well area 22 in the typical manner. Wheel well area 22 is bounded by a periphery 23. The cover member 30 of the present invention covers this wheel well area 22 to improve the skates appearance and to partially seal the bearing assembly 15 from dirt and debris.

Figure 3:
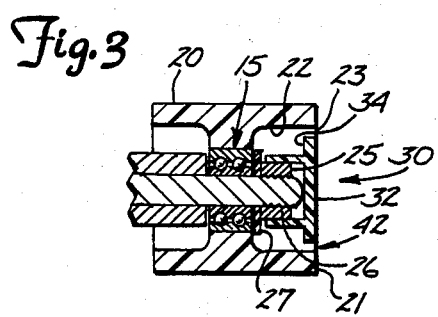
FIG. 3 is an elevational cross sectional view taken along line 3—3 of FIG. 1.

As best shown in FIGS. 2 and 3, skate wheel cover 30 includes a disk shaped cover member 31 having a face 32 and a back 33. A hollow tubular sleeve 36 projects from the back 33 of cover member 31 as shown. The end 37 of tubular sleeve 36 has an interior circumference 38. Cover member 31 has a circumference 40.

To assemble the skate wheel cover 30 to the skate wheel 20, the tubular sleeve 36 is merely slid over the hexagonal external surface 26 of nut 25. The sleeve 36 is designed so that its interior circumference 38 is slightly smaller than the hexagonal external surface 26 of nut 25. Hence, an interferance fit is provided between sleeve 36 and nut 25 so that sufficient frictional forces are generated to secure the cover 30 to nut 25. Moreover, sleeve 36 can be constructed from a resilient material such as plastic so that it will deform outward slightly during the interferance fitting operation to conform to some degree to the shape of the nut 25. Once the sleeve 36 is fully installed on nut 25, the face 32 of cover member 31 will generally align with the front surface 21 of wheel 20. See FIG. 3. In this installed position, a small air space 42 is provided between the circumference 40 of wheel 30 and the periphery 23 of wheel well 22. The air space 42 permits the wheel 20 to flex over uneven terrain.

Skate wheel covers would normally be installed on all four wheels of each skate or skateboard. Various designs would be applied to the faces 32 of the skate wheel covers 30 to improve the appearance of the skates or skate board. Furthermore, the wheel covers 30 will partially seal the wheel wells 22 against dirt and debris prolonging the life of the bearing assemblies 15.

The invention is equally applicable to skates and skate boards and to any apparatus having skate type wheels.

While the embodiment 30 of the present invention as shown in FIGS. 1-3 is generally the most preferred embodiment, other embodiments are also within the teachings of the invention.

Figure 4:
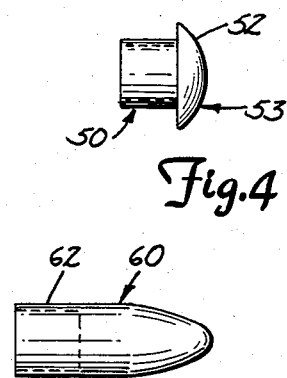
FIGS. 4 and 5 show alternate embodiments of the invention.

For example, FIG. 4 shows a skate wheel cover embodiment 50 which is similar to that shown in FIGS. 1-3, except that in this embodiment the face 52 is convex. It is envisioned that a metallic coating would be applied to the face 52.

Figure 5:
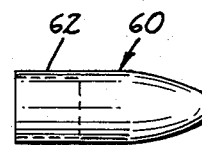

FIG. 5 shows another embodiment 60 of a skate wheel cover which has a bullet type shape. As with the previous two embodiments 30 and 50, embodiment 60 includes a tubular sleeve 62 which slides onto the nut 25 and is secured thereon by friction.

It is noted that inasmuch as the ½ inch hexagonal nut is the standard skate wheel mounting nut, the skate wheel covers of the present invention will fit virtually all skates and skate boards regardless of wheel size.

Having disclosed the preferred embodiment of the present invention and two alternative embodiments, it should be apparent that many variations and modifications of the invention are within the scope of its teachings. Consequently, the invention is intended to be limited only by the scope of the appended claims.

I claim:

1. In a skate wheel having a recessed wheel well which has a periphery, said skate wheel being rotatably supported on an axle by a bearing means, said axle having an externally threaded end projecting into said wheel well, an internally threaded nut being threadably engaged with said threaded end of said axle to secure said skate wheel to said axle, said nut being disposed within said wheel well and having an external surface, an improvement comprising:

a cover member having a front surface and a rear surface, said rear surface of said cover member having a central region, said cover member having an outer circumference; and means for securing said cover member to said axle, said securing means comprising a tubular member having a first end and a second end, said first end being rigidly secured to said central region of said rear surface so that said tubular member projects from said rear surface of said cover member, said second end being oppositely disposed from said first end and having a circular cross section and a cyllindrical interior surface, said interior surface of said second end of said tubular member being resilient and deforming outwardly when inserted over said external surface of said nut to frictionally secure said cover member to said nut, said outer circumference of said cover member being smaller than said periphery of said wheel well, said cover member being positioned within said wheel well with an airspace being provided between said circumference of said cover member and said periphery of said wheel well, said cover member and said tubular member comprising a plastic one piece unit.

2. The device of claim 1 wherein said front surface of said cover member is convex.

3. The device of claim 1 wherein said cover member is disk shaped and has a flat front surface.

* * * * *